April 15, 1958 — R. G. KNUDSEN — 2,830,450
TORQUE WRENCHES
Filed Nov. 4, 1953 — 2 Sheets-Sheet 1
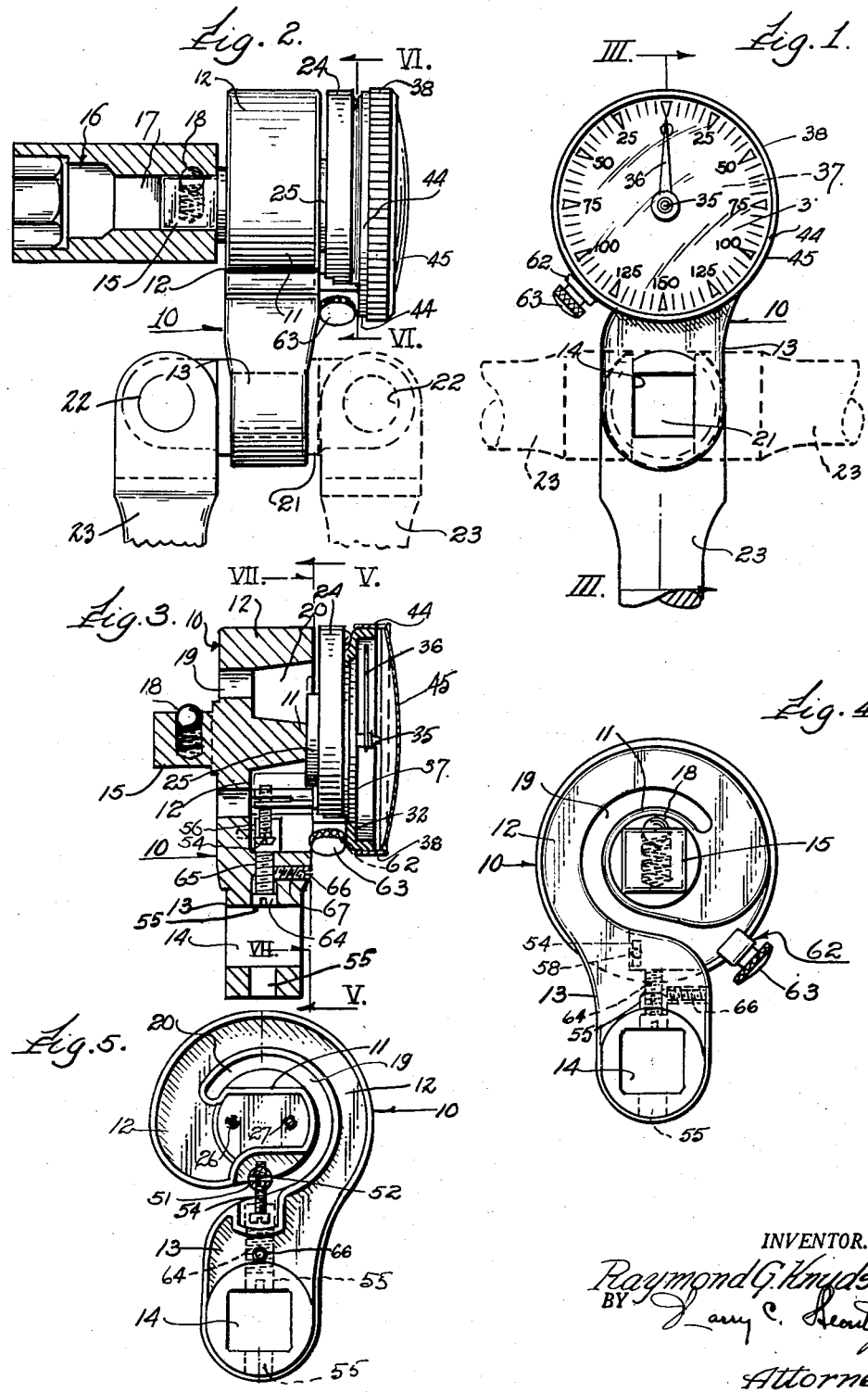
INVENTOR.
Raymond G. Knudsen.
BY Larry C. Seaton
Attorney.

April 15, 1958   R. G. KNUDSEN   2,830,450
TORQUE WRENCHES
Filed Nov. 4, 1953   2 Sheets-Sheet 2
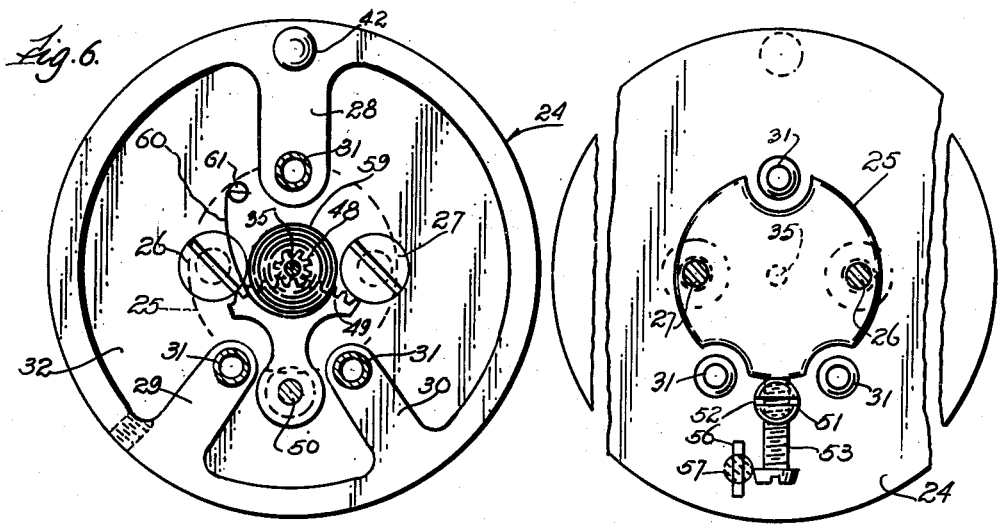
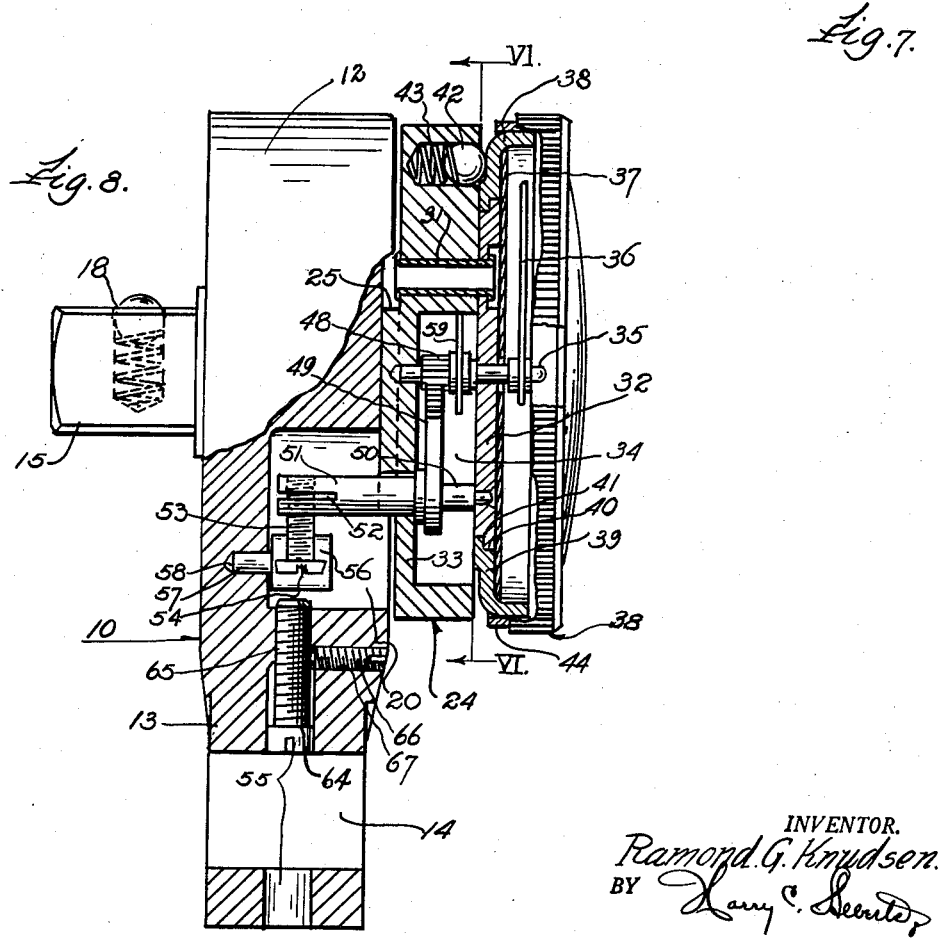
INVENTOR.
Ramond G. Knudsen
BY
Attorney.

United States Patent Office 2,830,450
Patented Apr. 15, 1958

2,830,450
TORQUE WRENCHES

Raymond G. Knudsen, Kenosha, Wis., assignor to Snap-On Tools Corporation, Kenosha, Wis., a corporation of Delaware Application November 4, 1953, Serial No. 390,168

10 Claims. (Cl. 73—139)

This invention relates to turning devices and more particularly to nut turning wrenches, although certain features thereof may be employed with equal advantage for other purposes.

It contemplates more especially the provision of a simple, dependable, accurate and compact torque wrench of the type involving a flexible beam of novel structure and shape serving as the load resisting and measuring element.

Numerous types of torque turning wrenches have heretofore been proposed, but these have not proven entirely satisfactory owing to their substantially increased bulk over ordinary nut turning tools and their failure to render a dependable and uniform service in gauging the torque applied in any nut or other fastening expedient such as a screw. There has been a long-felt want for a torque turning tool that is simple, compact, dependable, accurate, and instantly indicates the desired tension or registers any predetermined or pre-set tension or torque applied or to be applied to a nut or other fastening expedient.

The flexible beam type of torque measuring wrench has especially been subject to many practical criticisms owing to the friction involved in the mounts therefor and the comparatively appreciable bulk thereof. The flexible beam type of torque wrench is advantageous and possesses desirable characteristics except for the stated disadvantages, and with the teachings of the present invention these have been largely overcome by use of a new type of flexible beam that has a spiral spring action without having the inherent deficiencies of a spring for measuring torque. A novel spring-type beam is essentially a rigid load resisting member which does not require the hardness or high grade steel embodied in springs and which have many deficiencies insofar as measuring torque loads. The flexible beam is employed as a torque load resisting member without any mounts that present friction and other accuracy impeding influences.

Then, too, great difficulty has been encountered in maintaining the indicating mechanism in good condition of operation due to the abuses occasioned during the normal use in nut turning operations. Should the applied torque be released by rupture in the fastener or by accidental release at the instance of the attendant, the recoil on the dial mechanism and indicator is so rapid as to normally cause structural failures therein.

One object of the present invention is to simplify the construction and improve the operation of devices of the character mentioned.

Another object is to provide an improved flexible beam serving as a torque load resisting member in a measuring wrench or the like.

Still another object is to provide an improved flexible beam serving as a torque load resisting member in a measuring wrench or the like which does not require any mounts or other impediments to uniform accuracies over a period of extended use.

A further object is to provide a torque wrench having an improved flexible measuring beam that will flex commensurate with the implied load without variation over an extended period of time.

A still further object is to provide a spiral spring flexible planar beam which is inherently rigid and yet will flex responsive to resisting a torque turning load.

Still a further object is to provide a compact spirally-shaped torque measuring beam capable of serving as a compact nut or other fastener turning tool.

Other objects and advantages will appear from the following description of an illustrated embodiment of the invention.

In the drawings:

Figure 1 is a front view in elevation of a torque wrench embodying features of the present invention.

Figure 2 is a side view in elevation of the torque wrench shown in Figure 1 with the parts thereof shown in action to clarify the illustration.

Figure 3 is a side sectional view in elevation taken substantially along line III—III of Figure 1.

Figure 4 is a rear view in elevation of the torque wrench shown in Figure 1.

Figure 5 is a sectional view in elevation taken substantially along line V—V of Figure 3.

Figure 6 is an enlarged sectional view in elevation taken substantially along line VI—VI of Figures 2 and 8.

Figure 7 is an enlarged sectional view in elevation taken substantially along line VII—VII of Figure 3.

Figure 8 is an enlarged side view in elevation of the torque wrench similar to that illustrated in Figure 3, but with parts of the dial mechanism and mount broken away and shown in a section to clarify the illustration.

The structure selected for illustration is not intended to serve as a limitation upon the scope or teachings of the invention, but is merely illustrative thereof. There may be considerable variations and adaptations of all or part of the teachings depending upon the dictates of commercial practice.

The present embodiment comprises a metallic flexible load bearing member 10, in this instance, spirally-shaped to embody a circular hub portion 11 to which the nut turning or work load may be applied. The hub 11 extends in a clockwise direction to define a circular convolute extension 12 that extends for substantially a three-quarter turn to define a spiral load resisting beam. The load resisting beam 10 with its three-quarter turn convolution 12 terminates in a radially disposed shank 13. The shank 13 with the hub 11 and its spiral extension 12 defines a unitary resilient beam that is more or less a convoluted spiral having a diametrically offset shank 13 provided with a polygonal socket 14 with which any suitable handle or wrench-type turning implement may be associated.

It should be noted that the shank 13 is diametrically offset in alignment with the hub 11 which has a laterally extending polygonal shank 15 formed integral therewith and projecting therefrom to receive any suitable type of turning adapter such as a wrench socket 16. The detachable wrench socket 16 is of standard construction and has a polygonal bore 17 at one end thereof to serve as a complement of the polygonal hub extension 15 which is provided with a spring impelled ball detent 18 of standard construction. The spring impelled ball detent 18 frictionally engages the polygonal bore 17 to retain the wrench socket 16 on the polygonal axial hub shank 15 to discourage or preclude accidental separation or detachment of the wrench socket 16 therefrom. The hub 11 with its spiral extension 12 is shaped to define an appreciable and uniform annular space 19 therebetween so that force applied to the diametrically offset shank 13 through the medium of the socket 14 in spaced alignment with the hub 11 and its axial socket carrying shank 15, will provide a moment arm for the application of nut turning torque in either a clockwise or a counterclockwise direction so that there will be uniform flexing during which time the annular space 19 will close and open to some extent depending upon whether or not the force is applied to the shank 13 in a clockwise or counterclockwise direction (viewed from Figure 5).

The hub 11 with its convoluted extension 12 and the offset shank 13 is of appreciable depth or thickness to provide a deep substantially frusto-conical channel 20 on one side for communication with the annular space 19 on the other side of the beam 10 (Figure 3). It should be observed that the beam 10 tapers inwardly to a small extent in the region of the diametrically offset shank 13 (Figure 2) which has the polygonal socket 14 therein for registry of a suitable and complemental wrench head 21 which preferably though not essentially is pivoted at 22 to an elongated handle member 23 so that a torque turning load of appreciable force may be manually applied for nut turning in tightening or loosening fasteners through the medium of socket 16 or other suitable fastener turning adapter. In order to measure the extent to which the resilient beam 10 is flexed between the force applying shank 13—14 and the work gauging head 11—16 suitably calibrated measuring means are provided to extend axially of the hub 11 in a direction opposite to the work engaging shank 15 which carries an adapter such as the wrench socket 16.

The torque measuring instrumentality comprises, in this instance, a substantially circular housing 24 having an axial circular shoulder 25 to abut against and make contact with the axial hub portion 11 of the beam 10 for attachment thereto by means of diametrically aligned and spaced threaded fasteners such as the screws 26—27, in this instance two, which extend through the housing shoulder 25 for threaded engagement with correspondingly threaded apertures provided in the hub 11 of the beam 10. The calibrated meter housing 24 has a plurality of radially extending webs 28—29—30, in this instance three, which serve to receive tubular rivets 31 through their extremities to effect the attachment of a calibrated dial supporting plate 32 upon and against the radial webs 28—29—30. It should be noted that the web 28 extends diametrically between the angularly and oppositely disposed pair of webs 29—30 to provide a three-point attachment of the calibrated dial supporting plate 32 to the meter housing 24 in spaced relation to the bottom 33 thereof to provide an actuating instrumentality compartment 34 (Figure 8).

An axial pinion shaft 35 is axially disposed relative to the hub 11 of the beam 10 for journalled mounting between the calibrated dial suporting plate 32 and the bottom 33 to carry a dial point 36 above and in parallel spaced relation to the dial supporting plate 32 wherein a suitably calibrated circular dial 37 is held in position and confined by a dial ring 38. The dial ring 38 has an inwardly curved bottom 39 which terminates in an angular peripheral shoulder 40 formed complemental with a peripheral shoulder 41 provided on the dial supporting plate 32 so that the dial ring 38 can be rotated relative to the stationary supporting plate 32. The dial ring 38 is held against accidental relative rotation by means of a spring impelled ball detent 42 provided in a recess 43 provided in the radial web 28 proximate to the outer circumference thereof so that the spring impelled ball detent 42 will abut against the under side of the radial ring 38 to establish frictional contact therewith and necessitate manual rotation and positioning on the calibrated dial 37 which turns with the ring 38.

To this end, the dial ring 38 is provided with a ring clamp 44 which cooperates with a crystal cap 45 to retain a transparent crystal 46 within the dial ring 38 to serve as a closure therefor. The exterior peripheral edge 47 of the crystal cap 45 is knurled to enable the manual grasp thereof for rotation in one direction or the other in order to reset the position of the calibrated dial 37 in relation to the dial pointer 36. As shown, the dial pointer supporting shaft 35 carries a pinion 48 which meshes with a gear segment 49 carried by a stub shaft 50 which is also journalled between the dial supporting plate 32 and the bottom 33 of the meter housing 24 to provide an extension 51 within the frusto-conical chamber 20 defined in the beam 10 by reason of the circular extension 12 being in spaced relation with the hub 11.

As shown, the stub shaft extension 51 (Figure 8) has its extremity slitted as at 52 to receive a threaded machine screw 53 transversely therethrough for threaded anchored connection therewith against any possible accidental rotation. This is insured by the spring action created in the slitted extremity of the stub shaft extension 51 through which the machine screw 53 is threaded. The slotted cap 54 of the machine screw 53 is accessible for adjustment through an elongated bore 55 that extends longitudinally through the offset beam shank 13 for interruption by the transverse socket 14 therein. As shown, the machine screw head 54 is in the path of a hardened flat vertical plate 56 which has a reduced cylindrical shank 57 thereon for rigid press-fitted connection with a somewhat smaller recess 58 provided in the wall of the beam shank 13 which confronts the chamber 20 therein.

With this arrangement, any yield in the beam 10 by reason of the flex in the beam extension 12 occasioned responsive to turning a nut or other fastener through the medium of the adapter 16, will cause the offset beam shank 13 to move so that flat plate 56 will be displaced against the screw hand 54 and impart rotation to the stub shaft 50 which, in turn, will rotate the gear segment 49 which meshes with the pinion 48 to rotate the shaft 35, thereby correspondingly rotating the dial pointer 36 relative to the calibrated dial 37 for a distance commensurate to the force applied to the offset shank 13 by means of the handle or suitable wrench 23. In order to return the dial pointer 36 to its initial position when the force is released, a spiral coil spring 59 is anchored to the dial pointer shaft 33 between the pointer 36 and the pinion 48 (Figure 8) with one end 60 thereof anchored to a fastener screw 61 which is fixed to the meter housing 24 (Figure 6).

The meter ring 47 together with the dial housing 38 and its calibrated dial 37 is held in its desired initial position by means of a meter ring position locking screw 62 which extends from the dial housing 38 to engage the meter housing 24 (Figure 3) and preclude any relative rotation therebetween after the thumb screw 63 has been tightened. With this arrangement, the calibrated dial 37 can be positioned to compensate for any variations in the metering instrumentalities. As shown, the dial 37 can be calibrated with the proper indicia for foot-pounds and foot-inches depending upon the size of the beam 10.

The force with which the fastener such as the nut is turned or tightened through the medium of the adapter 16 on the hub shank 15, will be measured by the flex in the beam 10 which will commensurately displace the dial pointer 36 in one direction or the other depending on whether or not a left or right hand nut is being applied or loosened. To this end, the calibrated dial 37 is provided with corresponding indicia from the initial point zero of the dial pointer 36 so that the latter can be displaced clockwise or counterclockwise depending upon the direction in which the force is applied to the beam shank 13 through the medium of the handle or wrench member 23. So that the adjustment of the calibrated measuring instrumentalities will not be accidentally altered, a threaded machine screw 64 engaged the threaded portion 65 of the elongated bore 55 to serve as a closure therefor. A locking set screw 65 extends transversely through an aperture 66 to engage the machine screw 64 against removal.

It will be apparent from the foregoing that a very compact and efficient torque wrench has been provided which is highly accurate and will measure the actual force applied irrespective of where the handle or wrench number 23 is grasped by the user. The flexing of the beam 10 is uniform and commensurate with the force applied by reason of the particular shape of the beam and the fact that the moment arm is always the same between the point of force application which is the socket 14 and the hub 11. The slight movement of the hub 11 is compensated for by the corresponding movement of the socket 14 so that they are substantially in the same spaced relation at all loads within the elastic limit of the material from which the beam 10 is shaped or otherwise formed.

While I have illustrated and described a preferred embodiment of this invention, it must be understood that the invention is capable of considerable variation and modification without departing from the spirit of the invention. I, therefore, do not wish to be limited to the precise details of construction set forth, but desire to avail myself of such variations and modifications as come within the scope of the appended claims.

I claim:

1. In a torque wrench, the combination with a work engaging member, of a resilient torque resisting planar beam operatively connected to and encircling said work engaging member to terminate in a turning load applying shank serving as a planar moment arm relative to said work engaging member, said torque resisting beam being flexible to yield along a substantially circumferential planar path responsive to the application of force to said shank and about said work engaging member through the medium of said beam, and calibrated measuring means mounted on said beam to indicate the torque load sustained by said beam.

2. In a torque wrench, the combination with a work engaging member, of a resilient torque resisting planar beam operatively connected to and encircling said work engaging member in enveloping relation therewith to terminate in a turning load applying shank serving as a planar moment arm relative to said work engaging member, said torque resisting beam being flexible to yield along a substantially circumferential planar path responsive to the application of force to said shank and about said work engaging member through the medium of said beam, and calibrated measuring means mounted on said beam to indicate the torque load sustained by said beam.

3. In a torque wrench, the combination of a work engaging member of a spirally shaped resilient torque resisting planar beam operatively connected to and encircling said work engaging member to terminate in a turning load applying shank serving as a planar moment arm relative to said work engaging member, said torque resisting beam being flexible to yield along a substantially circumferential planar path responsive to the application of force to said shank and about said work engaging member through the medium of said beam, and calibrated measuring means mounted on said beam to indicate the torque load sustained by said beam.

4. In a torque wrench, the combination with a work engaging member, of a spirally shaped resilient torque resisting planar beam operatively connected to and encircling said work engaging member in enveloping relation therewith to terminate in a turning load applying shank serving as a planar moment arm relative to said work engaging member, said torque resisting beam being flexible to yield along a substantially circumferential planar path responsive to the application of force to said shank and about said work engaging member through the medium of said beam, and calibrated measuring means mounted on said beam to indicate the torque load sustained by said beam.

5. In a torque wrench, the combination with a work engaging member, of a spirally shaped resilient torque resisting planar beam operatively connected to and encircling said work engaging member in enveloping relation therewith to extend convolutely therefrom to yield along a substantially circumferential planar path responsive to the application of force about said work engaging member through the medium of said beam, and calibrated measuring means axially mounted on said beam to indicate the torque load sustained by said beam.

6. In a torque wrench, the combination with a work engaging member, of a normally rigid spiral resilient planar beam axially connected with said work engaging member, said spiral resilient planar beam being so shaped to render said normally rigid beam resilient and flexible under load and to return to its original shape when the applied load is released, a radially offset shank terminus on said planar beam, a handle member connected with said planar beam shank terminus to transmit a moment arm force to said work engaging member through the medium of said spiral planar beam to convolutely flex the latter commensurate with the applied force, and a calibrated indicater mechanism mechanically associated with said planar beam to measure the applied force.

7. In a torque wrench, the combination with a work engaging member, of a normally rigid spiral resilient planar beam axially connected with said work engaging member, said spiral resilient planar beam being so shaped to render said normally rigid beam resilient and flexible under load and to return to its original shape when the applied load is released, a radially offset shank terminus on said planar beam, a handle member detachably connected with said planar beam shank terminus to transmit a moment arm force to said work engaging member through the medium of said spiral planar beam to convolutely flex the latter commensurate with the applied force, and a calibrated indicator mechanism axially connected to said planar beam to measure the applied force.

8. In a torque wrench, the combination with a work engaging member, of a normally rigid spiral resilient planar beam axially connected with said work engaging member, said spiral resilient planar beam being so shaped to render said normally rigid beam resilient and flexible under load and to return to its original shape when the applied load is released, a radially offset shank terminus on said planar beam, a handle member detachably connected with said planar beam shank terminus to transmit a moment arm force to said work engaging member through the medium of said spiral planar beam to convolutely flex the latter commensurate with the applied force, a calibrated indicator mechanism axially connected to said planar beam, and relatively adjustable precision contact members between spaced points on said flexible planar beam and said calibrated indicating mechanism to measure the applied force.

9. In a torque wrench, the combination with a normally rigid radially contractable and expansible torque translating resilient planar beam, of a work engaging member operatively connected with one end of said planar beam, said spiral resilient planar beam being so shaped to render said normally rigid beam resilient and flexible under load and to return to its original shape when the applied load is released, a manual turning handle member operatively connected with the other end of said planar beam in space moment arm relationship with said work engaging member, a calibrated indicating mechanism mounted on said planar beam in axial alignment with said work engaging member, and relatively adjustable precision contact members between said torque translating planar beam and said calibrated indicating mechanism to measure the applied force to said handle members commensurate with the relative translation between the ends of said planar beam.

10. In a torque wrench, the combination with a normally rigid spirally shaped radially contractable and expansible torque translating resilient planar beam having an inner axial hub and an offset external extremity, said spiral resilient planar beam being so shaped to render said normally rigid beam resilient and flexible under load and to return to its original shape when the applied load is released, of a work engaging member operatively connected with the hub end of said planar beam, a manual turning handle member operatively connected with the offset external end of said planar beam in space moment arm relationship with said work engaging member, a calibrated indicating mechanism mounted on said planar beam in axial alignment with said work engaging member, and relatively adjustable precision contact members between said torque translating planar beam and said calibrated indicating mechanism to measure the applied force to said handle members commensurate with the relative translation between the ends of said planar beam.

References Cited in the file of this patent

UNITED STATES PATENTS

| | | |
|---|---|---|
| 2,144,731 | Zimmerman | Jan. 24, 1939 |
| 2,151,953 | Zimmerman | Mar. 28, 1939 |
| 2,219,632 | Naden | Oct. 29, 1940 |